(12) United States Patent
Godwin, Jr.

(10) Patent No.: US 10,549,673 B2
(45) Date of Patent: Feb. 4, 2020

(54) SYSTEM AND METHOD FOR PAVING A SURFACE AND REMOTELY CONTROLLING THE FLOW OF PAVING MATERIAL FROM A DUMP TRUCK INTO A HOPPER OF A PAVER

(71) Applicant: James Patrick Godwin, Jr., Dunn, NC (US)

(72) Inventor: James Patrick Godwin, Jr., Dunn, NC (US)

( * ) Notice: Subject to any disclaimer, the term of this patent is extended or adjusted under 35 U.S.C. 154(b) by 30 days.

(21) Appl. No.: 15/894,982

(22) Filed: Feb. 13, 2018

(65) Prior Publication Data

US 2019/0248265 A1 Aug. 15, 2019

(51) Int. Cl.
| | |
|---|---|
| *B60P 1/16* | (2006.01) |
| *E01C 19/48* | (2006.01) |
| *F15B 13/04* | (2006.01) |
| *F15B 11/10* | (2006.01) |
| *G05D 7/06* | (2006.01) |
| *F15B 21/08* | (2006.01) |
| *F16K 31/00* | (2006.01) |
| *F15B 13/042* | (2006.01) |

(52) U.S. Cl.
CPC .............. *B60P 1/16* (2013.01); *B60P 1/162* (2013.01); *E01C 19/48* (2013.01); *F15B 11/10* (2013.01); *F15B 13/042* (2013.01); *F15B 21/082* (2013.01); *F15B 2211/3052* (2013.01); *F15B 2211/32* (2013.01); *F15B 2211/325* (2013.01); *F15B 2211/327* (2013.01); *F15B 2211/329* (2013.01); *F15B 2211/7053* (2013.01); *F16K 31/00* (2013.01); *G05D 7/0629* (2013.01)

(58) Field of Classification Search
CPC .. B60P 1/16; B60P 1/162; E01C 19/48; F15B 11/10; F15B 13/042; G05D 7/0629
See application file for complete search history.

(56) References Cited

U.S. PATENT DOCUMENTS

| | | | | |
|---|---|---|---|---|
| 3,131,913 A | * | 5/1964 | Swarthout | B28C 5/4203 366/41 |
| 3,158,402 A | * | 11/1964 | Clement | B60P 1/18 298/20 R |
| 3,424,498 A | * | 1/1969 | Maxon, Jr. | B60P 1/34 298/7 |
| 3,483,804 A | * | 12/1969 | Nolan | E01C 19/21 404/109 |
| 3,851,804 A | * | 12/1974 | Fyrk | A01C 17/006 222/413 |
| 4,194,787 A | * | 3/1980 | Williamsen | B60P 1/16 105/261.2 |
| 5,154,488 A | * | 10/1992 | Maxon, III | B28C 5/4248 193/16 |
| 5,197,848 A | * | 3/1993 | Musil | E01C 19/48 414/809 |
| 5,356,238 A | * | 10/1994 | Musil | E01C 19/008 404/101 |
| 5,618,155 A | * | 4/1997 | Tighe | B60D 1/36 280/504 |
| 5,722,790 A | * | 3/1998 | Spray | E01C 19/48 404/108 |

(Continued)

*Primary Examiner* — Abigail A Risic
(74) *Attorney, Agent, or Firm* — Coats & Bennett, PLLC

(57) ABSTRACT

A method for paving wherein the paving operator or a person in the vicinity of the paver remotely controls the flow of paving material from a dump truck into the hopper of the paver.

10 Claims, 3 Drawing Sheets

(56) References Cited

U.S. PATENT DOCUMENTS

| | | | | |
|---|---|---|---|---|
| 6,880,894 | B2* | 4/2005 | Obermeyer | B60P 1/283 |
| | | | | 298/11 |
| 8,077,023 | B2* | 12/2011 | King | B60Q 1/2657 |
| | | | | 340/426.15 |
| 2005/0248208 | A1* | 11/2005 | Boon | B60P 1/165 |
| | | | | 298/18 |
| 2006/0002762 | A1* | 1/2006 | Crampton | E01C 19/15 |
| | | | | 404/110 |
| 2010/0283598 | A1* | 11/2010 | King | B60Q 1/2657 |
| | | | | 340/472 |
| 2013/0266376 | A1* | 10/2013 | Herzberg | E01C 19/48 |
| | | | | 404/83 |
| 2017/0159250 | A1* | 6/2017 | Maeyama | E01C 7/35 |

* cited by examiner

US 10,549,673 B2

SYSTEM AND METHOD FOR PAVING A SURFACE AND REMOTELY CONTROLLING THE FLOW OF PAVING MATERIAL FROM A DUMP TRUCK INTO A HOPPER OF A PAVER

FIELD OF THE INVENTION

The present invention relates to pavers of the type typically used to pave roads and streets, and more particularly to a remote control system for controlling the flow of paving material from a dump truck into a hopper of a paver.

BACKGROUND OF THE INVENTION

Typically, a street or road paving process entails a paver and a dump truck positioned closely ahead of the paver. Paving material carried in the load bed of the dump truck flows from the rear end of the load bed into a hopper and forms a part of the paver. Controlling the flow of paving material into the hopper is necessary since the hopper has a limited capacity. During the process of transferring paving material from the load bed to the hopper, it is necessary to tilt the upper end of the load bed. As more and more paving material is discharged from the load bed into the hopper, it is necessary to continue to raise the load bed. In some cases, the load bed is raised too high and too much paving material is discharged from the load bed. In this case, the load bed should be lowered in order to appropriately adjust the flow of paving material from the rear end of the load bed. Controlling the flow of paving material is done on the go. That is, as the paver and dump truck move forwardly, the attitude (or inclination) of the load bed of the dump truck is adjusted to provide an appropriate flow of paving material into the hopper.

This can be challenging. It is not uncommon to overfill the hopper, which results in paving material being spilled onto the road or the street, requiring time and labor to address the spill. However, what makes this especially challenging is that the person actuating and adjusting the attitude of the load bed is in the cab of the dump truck facing forwardly. It is impossible for the dump truck driver to directly see the hopper, the amount of paving material in the hopper, the paver or the operator on the paver. In order to address this problem, the conventional practice is to position a person on the roadway or street where this person walks along beside the paver. This person may be termed a signaler or a guide. His or her function is to instruct the dump truck driver on raising and lowering the load bed to provide an appropriate flow of paving material from the load bed into the hopper. The dump truck driver views the signaler or the guide through the driver's side rear view mirror. The signaler or guide communicates with the driver through hand signals or shouting.

There are a number of problems with this approach to controlling the flow of paving material from the load bed into the hopper of the paver. First, even with the help of the guide, it is still difficult to accurately control the flow of paving material from the load bed into the hopper. It is difficult for the in-cab driver to make small and precise adjustments in the attitude of the load bed that may be required from time-to-time. It is not uncommon for the adjustment to oversupply or undersupply. When there is an oversupply, spills occur. When there is an undersupply of paving material, then this impacts the overall paving efficiency, causing the paver to have to adjust its pace or even stop.

Secondly, the requirement of the guide or signaler is a cost that has to be accounted for. This increases the paving cost.

Finally, there is a safety issue. Often paving is performed on interstate or busy highways. With this conventional approach, the guide or signaler walks in close proximity to busy traffic. Because the guide or the signaler is busy communicating with the dump truck driver, it is possible that the guide or signaler may be less attentive than is prudent.

Therefore, there is a need for a paving system and process that addresses these problems. In particular, there is a need for a system and process for controlling the flow of paving material from the load bed to the hopper of the paver that enables accurate and precise control and at the same time, eliminates the need for a walking guide or signaler.

SUMMARY OF THE INVENTION

The present invention relates to a method of paving where the operator of a paver or another person remotely controls the flow of paving material into the hopper of a paver.

In one embodiment, the flow of paving material into the hopper of the paver is remotely controlled via a pneumatic system that is configured to control a hydraulic system that is employed to vary and control the flow of paving material from a load bed of a dump truck into the hopper of the paver.

In another embodiment, the present invention relates to a dump truck having a load bed that is raised and lowered by a hydraulic system on the dump truck. A pneumatic system is also mounted on the dump truck and is configured to actuate and control the hydraulic system. The pneumatic system is in turn actuated by a receiver mounted on the dump truck which receives wireless commands from a remote transmitter. Hence, by directing wireless commands from the remote transmitter, the receiver is operative to control the pneumatic system, which in turn controls the hydraulic system which raises and lowers the load bed of the dump truck.

Other objects and advantages of the present invention will become apparent and obvious from a study of the following description and the accompanying drawings which are merely illustrative of such invention.

BRIEF DESCRIPTION OF THE DRAWINGS

FIG. 1 is a side elevational view illustrating the method of paving a road, street, parking lot or the like.

DESCRIPTION OF EXEMPLARY EMBODIMENTS

Figure 1:
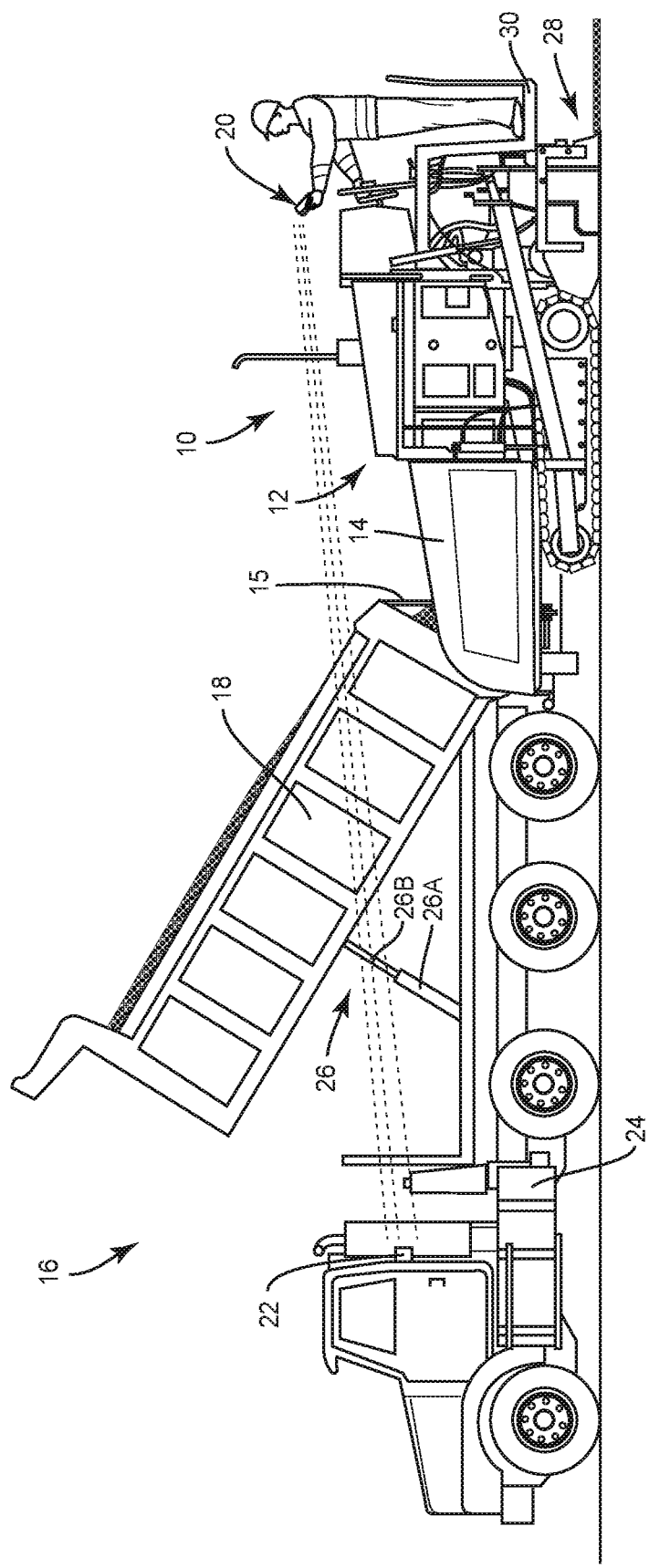

With further reference to the drawings, particularly FIG. 1, a paving system and process is shown therein and indicated generally by the numeral 10. A paver 12, including a front hopper 14, moves over a surface, such as a street, road or parking lot, and applies a paving material, such as asphalt, to the surface being traversed. Positioned closely ahead of the paver 12 is a dump truck 16. Dump truck 16 includes a dump bed or load bed 18 that contains paving material. Paving material in the load bed 18 is discharged into the hopper 14 of the paver 12. Paver 12 in conventional fashion conveys the paving material rearwardly to a screed 28 that levels and prepacks the asphalt mix to a thickness, grade, crossfall and ground profile.

In the paving process, the rear end of the load bed 18 is maintained over the hopper 14. As the paver 12 moves forwardly, paving material flows from the load bed 18, through an opening between the open tailgate 15 and load bed, and into the hopper 14. Paver 12 and dump truck 16 move generally in unison. From time-to-time, the attitude (or tilt) of the load bed 18 must be adjusted in order to control and facilitate the flow of paving material from the load bed into the hopper 14. To adjust the attitude of the load bed 18, the load bed is raised or lowered. To raise or lower the load bed 18, there is provided a remote control system which enables the paver operator or another person to raise and lower the load bed, as well as to lock and unlock the tailgate 15 to the load bed. This remote control system includes a transmitter 20 and a receiver 22.

In one embodiment, the transmitter 20 is mounted on the paver 12 or simply held by an operator stationed on the paver. See FIG. 1. Receiver 22 is mounted on the dump truck 16 and is operatively connected to a pneumatic control system that controls the raising and lowering of the load bed 18 while also controlling the locking and unlocking of the tailgate 15. Thus in this example, an operator of the paver 12 can directly see the hopper 14, the amount of paving material in the hopper, as well as the load bed 18 and its position. By actuating the transmitter 20, the paver operator can raise or lower the load bed 18 and precisely control the flow of paving material from the load bed into the hopper.

With further reference to FIG. 1, it may be beneficial to briefly review some of the basic features of the dump truck 16 and paver 12. First, with respect to the dump truck 16, the same is provided with an air compressor (now shown) for generating compressed air that is typically stored in a compressed air tank 24. This is referred to as a compressed air source. Compressed air can be used for any number of functions on the dump truck 16. For example, it is common for such trucks to include air brake systems. To power the load bed 18 up and down, there is provided a double acting hydraulic cylinder 26. Hydraulic cylinder 26 includes a cylinder 26A and a rod portion 26B that extends from the cylinder and connects to the underside of the load bed 18. In this case, the hydraulic lift cylinder 26 is a double acting hydraulic cylinder. Directing hydraulic fluid under pressure into one end of the cylinder 26A causes the load bed 18 to be raised. Directing hydraulic fluid under pressure into the other end of the cylinder 26A causes the load bed 18 to be lowered. Subsequently herein a hydraulic control system 50 for powering the hydraulic cylinder 26 will be discussed.

Briefly, paver 12 will be discussed. It should be appreciated that the detailed structure of paver 12 is not per se material to the present invention. For a complete and unified understanding of the paver 12 and how the paver paves a surface, a brief discussion is appropriate. Paver 12 may be a wheeled or tracked machine that is equipped with the hopper 14. Hopper 14 is disposed on the front end of the paver 12 and is used for storing paving material to be deposited on a work surface being traversed by the paver. Generally, paving material from the hopper is moved via a conveyor system to the rear portion of the paver 12 where the material is deposited onto the work surface. Hopper 14 includes an open top configured to receive paving material from the dump truck 16. Paving material discharged by the dump truck 16 serves to replace deposited paving material. Paving material is distributed across at least a portion of the width of the paver 12 by an auger or other distribution device.

A screed 28 is connected or provided about the rear end of the paver 12. Paver 12 pulls the screed 28 over the fleshly deposited paving material to create a mat of paving material having a desired thickness on top of the work surface. Screed 28 includes one or more screed plates that smooth out the fresh paving material. The screed plates are adjustable via one or more associated actuators for changing the height, the width and/or slope of the screed plates. Operating parameters, such as ground speed of a paver 12 and the height, width and slope of the screed 28, can be controlled from the operator's station 30 using various conventional control devices.

For a more complete and unified understanding of the basic structure and function of paving machines, one is referred to the disclosures found in U.S. Pat. Nos. 7,244,077; 5,863,149; 5,529,434; 5,401,115; U.S. 2017/0205814; and U.S. 2017/0228108. The disclosures of these patents and patent publications are expressly incorporated herein by reference.

For actuating and controlling the hydraulic lift cylinder 26, there is provided the hydraulic control system 50 mounted on the dump truck 16. See FIG. 2. In addition, there is provided on the dump truck 16 a pneumatic system 60 for actuating a hydraulic control valve 76 that forms a part of the hydraulic control system 50. Furthermore, there is provided a remote control unit that includes the receiver 22 mounted on the dump truck 16 and configured to receive wireless commands from the remote transmitter 20. As discussed below, receiver 22 is operatively connected to a directional control valve 82 and forms a part of the pneumatic system 60. Receiver 22 is configured to actuate the directional control valve 82 which results in the pneumatic system 60 actuating and controlling the hydraulic control valve 76 which in turn controls the movement of the hydraulic cylinder 26 and the raising and lowering of the load bed 18.

Figure 2:
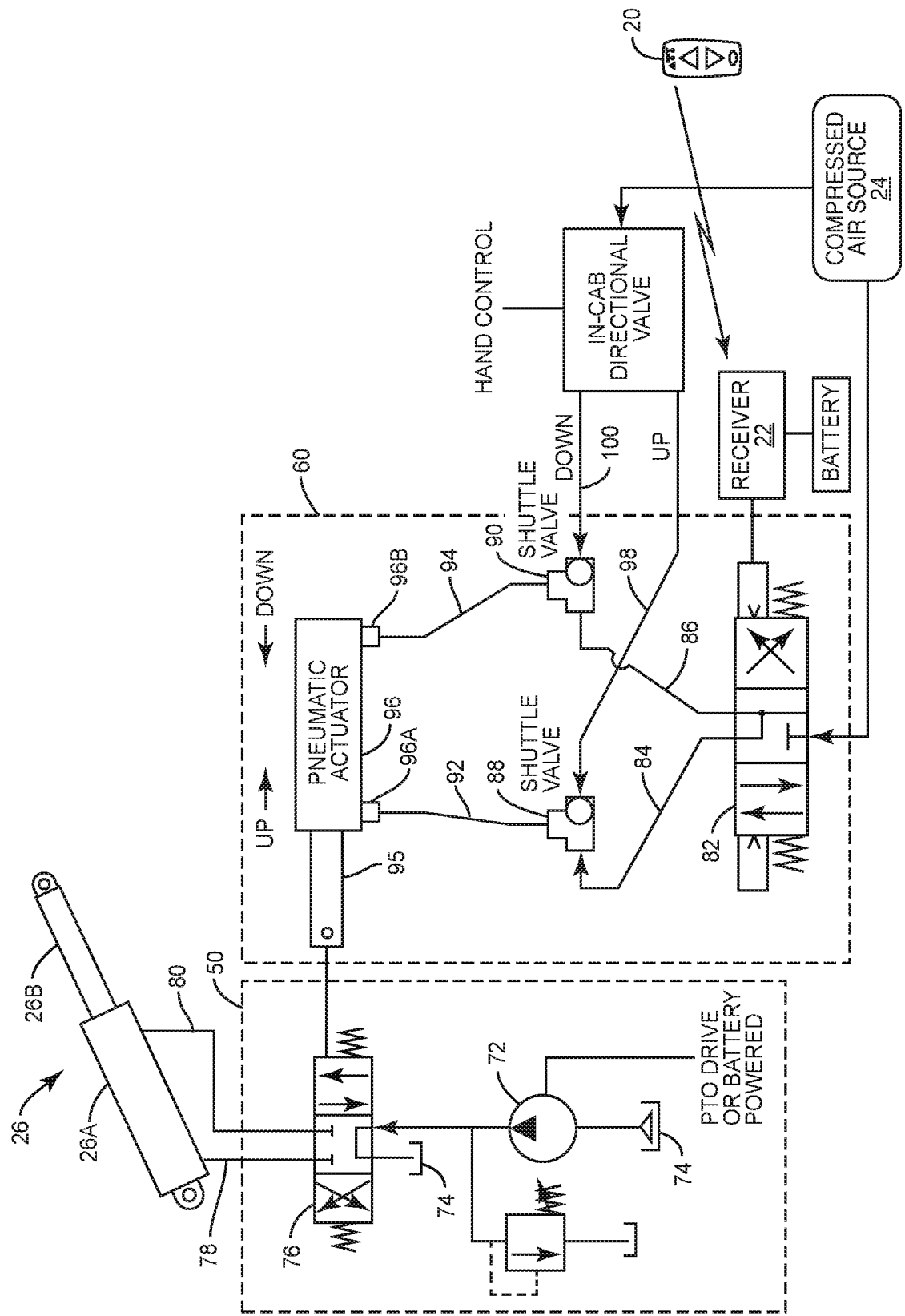
FIG. 2 is a schematic drawing illustrating the hydraulic control system, the pneumatic system and the remote control unit for controlling the pneumatic system.

Hydraulic control system 50 comprises a hydraulic pump 72, hydraulic fluid reservoir or tank 74 and the hydraulic control valve 76. Hydraulic pump 72 can be powered by a power takeoff from the dump truck 16 or can be powered by a battery carried on the dump truck. Hydraulic control valve 76 is a four-way, three position valve that can be actuated in various ways. In one embodiment, hydraulic control valve 76 is spring bias to assume the center position shown in FIG. 2. However, the hydraulic control valve 76 is moved back and forth between extreme left and right positions mechancially. Extending from the output side of the hydraulic control valve 76 is two hydraulic lines 78 and 80. Hydraulic line 78 leads from the hydraulic control valve 76 to one end of cylinder 26A. Hydraulic line 80 leads from the hydraulic control valve 76 to the other end of cylinder 26A. In the position shown in FIG. 2 and when the hydraulic pump 72 is actuated, hydraulic fluid is pumped from the reservoir or tank 74 via the pump 72 to the hydraulic control valve 76 and back to tank. Again, the position shown in FIG. 2 is a neutral position where the hydraulic cylinder set is not extended or retracted. To raise the load bed 18 and extend the rod 26B, the hydraulic control valve is shifted to the right, as viewed in FIG. 2, and this results in hydraulic fluid being pumped from pump 72 through the valve 76 into line 78 which extends the rod 26B of the hydraulic cylinder 26. To retract the rod 26B and lower the load bed 18, the hydraulic control valve 76 is shifted to the left, which results in hydraulic fluid being directed from the pump 72, through the valve 76 and into line 80. The hydraulic control system 50 described above and shown in FIG. 2 is one exemplary control system. It is appreciated by those skilled in the art that other specific hydraulic control elements can be used to raise and lower the load bed 18.

Operatively associated with the hydraulic control system 50 is the pneumatic system 60. The primary function of the pneumatic system 60 is to actuate the hydraulic control system 50 and more particularly to actuate and control the hydraulic control valve 76. In addition, the pneumatic system 60 is configured to be compatible with a remote control unit. Thus, the pneumatic system 60 functions as an interface between the hydraulic control system 50 and the receiver 22 of the remote control unit. Thus, the remote control unit is configured and designed to actuate the pneumatic system 60 which in turn actuates and controls the hydraulic control valve 76 which in turn raises and lowers the load bed 18 of the dump truck 16.

Viewing the pneumatic system 60 in more detail, it includes a directional control valve 82. Directional control valve 82 is configured to receive compressed air from the source of compressed air 24 that is found on the dump truck 16. Various types and designs of directional control valves can be employed. In this particular example, the directional control valve 82 is a three position valve that is spring loaded from each side so that the valve is biased to assume the center position. See FIG. 2. However, the directional control valve 82 can be actuated from either side and moved right to left or left to right as viewed in FIG. 2. In the particular embodiment illustrated and discussed herein, the directional control valve 82 is an electrical solenoid valve that is configured to shift the valve towards either side to change the directional output of the valve.

Leading from the output side of the valve 82 is a pair of hydraulic lines 84 and 86. Line 84 leads to a three port shuttle valve 88 while line 86 leads to a like three port shuttle valve 90. Note that each shuttle valve 88 and 90 include two inlet ports and an outlet port. In the case of the shuttle valves 88 and 90, when compressed air enters one inlet port, it pushes a ball towards and against the other inlet port. In this way, two different streams of compressed air can be directed into the shuttle valve without the threat of backflow from one source to the other. From the shuttle valves 88 and 90 there are two lines 92 and 94 that lead to a pneumatic actuator 96. Pneumatic actuator 96 is a three position actuator that includes an actuating arm 95 that is actuated and moved back and forth from a neutral position by compressed air entering the pneumatic actuator. Note that the pneumatic actuator 96 includes two compressed air inlet ports 96A and 96B. It follows that compressed air directed into inlet port 96A will move the actuating arm 95 in one direction from neutral while compressed air entering into port 96B will move the actuating arm in the opposite direction from neutral.

Actuating arm 95 of the pneumatic actuator 96 is operatively connected to the yjtrr position hydraulic control valve 76. It thus follows that by actuating pneumatic actuator 96 that the actuating arm 95 thereof will cause the hydraulic control valve 76 to be moved back and forth.

Now turning to the remote control unit, the receiver 22 is mounted on the dump truck 16 and is operatively connected to the directional control valve 82 that forms a part of the pneumatic system 60. As is appreciated from the discussion below, the receiver 22 is configured to actuate the directional control valve 82 which in the case of one embodiment is an electrical solenoid valve. In addition, the receiver 22 is operatively connected to a solenoid actuator 81 that is operatively connected to a latch that latches the tailgate 15 of the dump truck 16. See FIG. 3.

Receiver 22 in one particular embodiment is battery powered. Hence the battery power supplied to the receiver 22 is used to actuate the solenoid directional control valve 82 as well as the solenoid that controls the latch of the tailgate.

Figure 4:
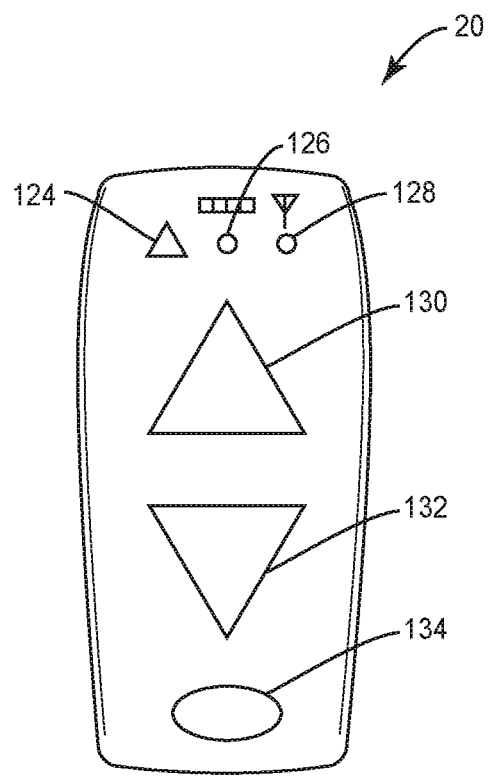
FIG. 4 is an illustration showing the remote transmitter.

For providing wireless commands to the receiver 22, there is provided the wireless remote 20. See FIG. 4. As seen in FIG. 4, the wireless remote 20 includes a power on-off button 124, a battery status light 126 and a connectivity indicator 128. In addition, remote 20 includes a hoist up button 130 and a lower down button 132. As noted above, the wireless remote 20 includes a tailgate latch switch 134.

Figure 3:
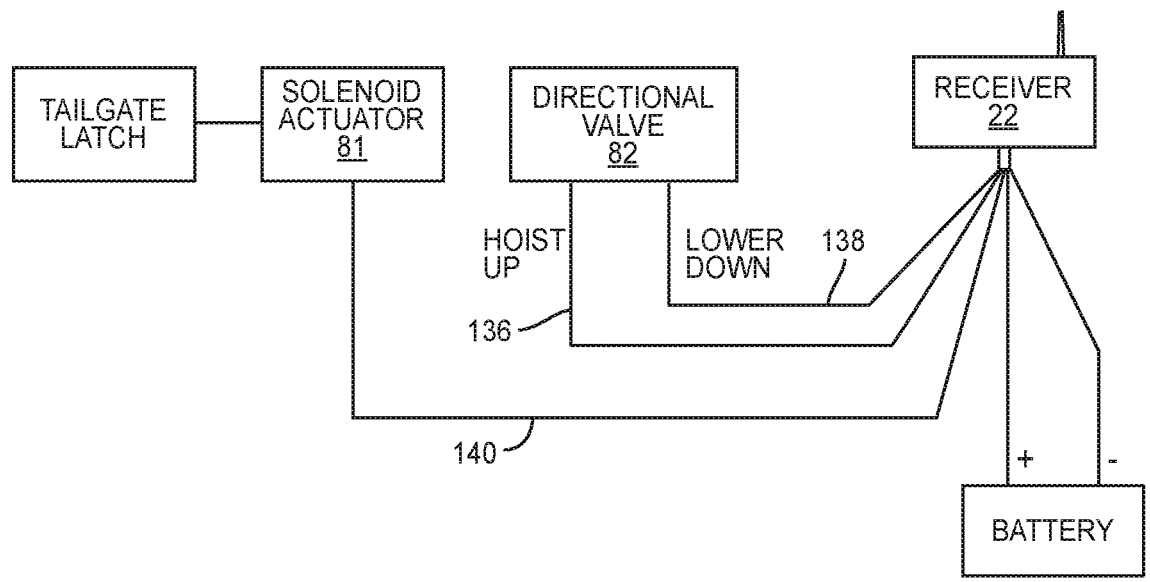
FIG. 3 is a schematic illustration showing how the receiver of the remote control unit is employed to control the flow of paving material from the load bed of a dump truck into the hopper of the paver.

Solenoid directional valve 82 is spring biased to assume the center position shown in FIG. 2. Directional control valve 82 can be selectively energized to shift to the left or shift to the right, which will in turn controls the flow of compressed air to the pneumatic actuator 96, which will in turn shifts and controls the position of the hydraulic control valve 76. Thus, as seen in FIG. 3, receiver 22 includes two actuating lines 136 and 138. Line 136 is referred to as a hoist up line and the electrical output of that line is configured to selectively energize the directional control valve 82 so as to cause the hydraulic cylinder 26 to extend and cause the load bed 18 to tilt upwardly. Line 138 provides an electrical output to energize the directional control valve 82 such that the opposite occurs; that is, that the hydraulic cylinder 26 is retracted, causing the load bed 18 to be lowered. In addition, receiver 22 is operatively connected to a third output line 140 that is operatively connected to the solenoid that actuates the tailgate latch.

In one embodiment, the hoist up and lower down buttons 130 and 132 are configured as momentary controls. That is, by holding the hoist up button 130 down, hydraulic fluid is directed into the hydraulic cylinder 26, causing the load bed to raise. Once the hoist up button 130 is released, the directional control valve 82 assumes its normal center position since it is spring biased to assume that position. The same holds true for the down button 132. In both cases, these two buttons 130 and 132 must be held down in order for the load bed 18 to continue to be raised or lowered. In practice, the paving operator or another person would generally be making relatively small adjustments in the attitude of the load bed 18 and hence the buttons 130 and 132 will only be held down momentarily. However, the remote 20 can still be used to raise the load bed 18 from a generally horizontal position to its maximum elevated position by continuously holding down the hoist up button 130. The same holds true for lowering the load bed 18 from its maximum elevated position to the lower horizontal position.

In the case of the tailgate latch, simply pressing the tailgate latch switch 134 will unlatch the tailgate and pressing the button again will latch the tailgate latch.

Also, it is appreciated that the pneumatic actuator 96 can be actuated and controlled independently of the receiver 22. As illustrated in FIG. 2, a driver in the cab of the dump truck 16 can cause compressed air to be directed from an in-cab air directional valve to either line 98 or 100 and to the shuttle valves 88 and 90. Accordingly, the dump truck driver can actually control the pneumatic actuator 96 and cause the load bed 18 to raise or lower.

In the paving process, the remote 20 is either fixed to the paver in close proximity to the operator's station 30 or held by the paver operator or another person. Thus, as the paver 12 and the dump truck 16 advances, the paver operator, for example, can control the attitude of the load bed 18 via the wireless remote 20. That is, the paver operator can unlatch the tailgate by pressing button 134 of the remote 20. Then the load bed 18 can be raised upwardly by pressing hoist up button 130. This causes the load bed 18 to rise up and for paving material to flow from the load bed 18 into the hopper 14 of the paver. Then as the paver 12 and dump truck advance together, the paver operator can make continuous adjustments in the attitude of the load bed 18 via the wireless remote 20. The paver operator can either raise or lower the load bed in order to control and vary the flow of the paving material from the load bed into the hopper 14.

The basic system and process described above works as follows. The dump truck operator backs up to the paving machine 12 with a load of asphalt or paving material. Up until this time, the truck is in a transport mode and the load bed 18 is not operational. Once the dump truck contacts the front rollers of the paver 12, the truck operator will engage the PTO. Engaging the PTO causes the PTO to engage and to drive the hydraulic pump 72, although the hydraulic control valve is in the centered or neutral position shown in FIG. 2. Engaging the PTO also powers up the truck mounted wireless receiver 22 so that the paver operator has secondary control over the load bed 18. It should be pointed out that the dump truck drive is ultimately responsible for the safe operation of the dump truck and has the ability at any time to take over operations as a primary operator. That is, at any time the dump truck operator, through in cab controls, can control the articulation of the load bed 18. Once the dump truck is properly situated in front of the paver, the paver operator takes over secondary control, raises the load bed 18 a small amount and opens the tailgate 15 to allow paving material to flow into the hopper 14 of the paving machine 12. As the machine paves and pushes the dump truck forward, the paver operator can raise the load bed 18 at will to cause a continuous supply of paving material to flow from the load bed 18 into the hopper 14 of the paver. Once the load bed 18 is empty, the paver operator can fully lower the load bed 18 and relatch the tailgate 15, at which time an audible or visual signal will be given to the truck driver to disengage the PTO and pull away from the work site. Disengaging the PTO disables the wireless receiver mounted on the truck.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of paving a surface with a paver and remotely controlling and varying the flow of paving material from the dump truck into the paver, the method comprising:
   positioning the paver behind a dump truck having a load bed containing the paving material;
   positioning a hopper of the paver underneath a rear portion of the load bed of the dump truck;
   remotely controlling and varying the flow of paving material from the load bed of the dump truck into the hopper of the paver by remotely raising and lowering the load bed of the dump truck;
   using the paving material received in the hopper of the paver to pave the surface being traversed by the paver; and
   wherein the dump truck includes a hydraulic system for raising and lowering the load bed and wherein remotely controlling and varying the flow of paving material from the load bed of the dump truck into the hopper of the paver includes remotely actuating a pneumatic system disposed on the dump truck which in turn actuates the hydraulic system and causes the hydraulic system to raise or lower the load bed of the dump truck and thereby control the flow of paving material from the load bed into the hopper of the paver.

2. The method of claim 1 wherein controlling and varying the flow of paving material from the load bed of the dump truck into the hopper is carried out from the paver by an operator stationed on the paver through a transmitter carried by the paver and a receiver mounted on the dump truck and operatively connected to a control system that controls the raising and lowering of the load bed.

3. The method of claim 1 including remotely unlatching a latch that latches a tailgate of the load bed and permitting paving material to flow from a rear portion of the load bed.

4. The method of claim 1 wherein the hydraulic system comprises a hydraulic cylinder for raising the lowering the load bed, a hydraulic pump for pumping hydraulic fluid to the hydraulic cylinder, and a hydraulic control valve for controlling the flow of hydraulic fluid from the hydraulic pump to the hydraulic cylinder;
   and wherein remotely controlling and varying the flow of paving material from the load bed of the dump truck into the hopper of the paver comprises:
   through a transmitter located remotely from the dump truck and a receiver mounted on the dump truck, actuating a compressed air control system and directing compressed air from a compressed air source located on the dump truck through a directional control valve to a pneumatic actuator that is operatively connected to the hydraulic control valve and operative to shift the hydraulic control valve between at least two positions for raising and lowering the load bed of the dump truck.

5. The method of claim 1 wherein remotely controlling and varying the flow of paving material from the load bed of the dump truck into the hopper of the paver comprises:
   wirelessly sending command signals from a transmitter located remotely from the dump truck to a receiver mounted on the dump truck where the signals are operative to raise and lower the load bed of the dump truck;
   to raise the load bed, command signals from the transmitter to the receiver cause the receiver to position a directional control valve in a first position and cause compressed air from a compressed air source on the dump truck to pass through the directional control valve in the first position to a first compressed air flow path which leads to a first input of a pneumatic actuator which is operative to position a hydraulic control valve in a first position and direct hydraulic fluid from a hydraulic source through a hydraulic pump to a hydraulic cylinder that is operatively connected to the load bed to raise the load bed; and
   to lower the load bed, command signals from the transmitter to the receiver cause the receiver to position the directional control valve in a second position and cause the compressed air from the compressed air source to pass through the directional control valve in the second position to a second compressed air flow path which leads to a second input of the pneumatic actuator which is operative to position the hydraulic control valve in a second position and cause the hydraulic cylinder to lower the load bed.

6. The method claim 1 wherein remotely controlling and varying the flow of paving material from the load bed into the hopper of the paver comprises:

directing compressed air from a compressed air source on the dump truck to a directional control valve;

remotely actuating the directional control valve through a receiver that receives commands from a remote transmitter;

wherein remotely actuating the directional control valve causes compressed air to be directed to a pneumatic actuator that is operatively connected to a hydraulic control valve that controls the flow of hydraulic fluid to a hydraulic cylinder and controls the raising and lowering of the load bed; and in response to the pneumatic actuator receiving compressed air, shifting the hydraulic control valve to either raise or lower the load bed.

7. The method of claim 6 further including:

directing compressed air from the directional control valve to one of two shuttle valves; and thereafter directing the compressed air from the one of two shuttle valves to the pneumatic actuator.

8. The method of claim 7 wherein each of the shuttle valves is a three port shuttle valve configured to enable compressed air to be directed to the shuttle valves from four different compressed air lines that in turn enable the pneumatic actuator to be actuated either remotely or through another actuating source.

9. A method of paving a surface with a paver and remotely controlling and varying the flow of paving material from a load bed of a dump truck into the paver, wherein the dump truck includes a hydraulic system for raising and lowering the load bed which comprises a hydraulic cylinder operatively connected to the load bed, a hydraulic pump and a hydraulic control valve operatively connected between the hydraulic pump and the hydraulic cylinder, and wherein the dump truck further includes an on-board actuating system disposed on the dump truck for actuating the hydraulic control valve and comprises an actuator operatively connected to the hydraulic control valve for moving the hydraulic control valve between at least two positions and a receiver mounted on the dump truck and configured to receive wireless command signals from the transmitter located remotely from the dump truck, the method comprising:

positioning the paver behind the dump truck containing the paving material;

positioning a hopper of the paver underneath a rear portion of the load bed of the dump truck;

remotely controlling and varying the flow of paving material from the load bed of the dump truck into a hopper of the paver by:

(a) wirelessly sending command signals from the transmitter located remotely from the dump truck to the receiver;

(b) in response to the receiver receiving the command signals from the transmitter, actuating the actuator which in turn drives the hydraulic control valve back and forth between a first position that raises the load bed and a second position that lowers the load bed; and using the paving material received in the hopper of the paver to pave the surface being traversed by the paver.

10. The method of claim 9 wherein the actuating system on the dump truck further includes a control valve operatively connected between the actuator and the receiver and wherein the control valve moves back and forth between first and second positions so as to actuate the actuator.

\* \* \* \* \*